Dec. 23, 1958  R. K. SHELLMAN ET AL  2,865,663
PUMP ROD ASSEMBLY
Filed Sept. 13, 1954

Roy K. Shellman,
Clarence H. Leathers,
INVENTORS.

BY

ATTORNEY.

United States Patent Office 2,865,663
Patented Dec. 23, 1958

2,865,663

PUMP ROD ASSEMBLY

Roy K. Shellman, Compton, and Clarence H. Leathers, Redondo Beach, Calif., assignors to Macclatchie Manufacturing Company, Compton, Calif., a corporation of California Application September 13, 1954, Serial No. 455,384

5 Claims. (Cl. 287—111)

This invention has to do with reciprocating parts connecting a prime mover with an oil well mud pump, and particularly with improved means for connecting a crank driven intermediate rod or pony rod reciprocated by a prime mover with a mud pump piston rod. Primarily, the invention is directed to the objective of providing an improved coupling means which greatly simplifies the operation of coupling and uncoupling these rods.

The usual means for connecting pony and piston rods in end-to-end relation for reciprocating movement consists of a threaded connection to which the end of the piston rod is externally threaded to engage an internally threaded bore in the pony rod. One disadvantage resulting from the use of this type of connection lies in the necessity for rotating the piston rod a number of times in order to couple or uncouple it from the pony rod. The piston rod is heavy and difficult to rotate, and any movement of the mud pump piston is made extremely difficult by reason of the presence of the abrasive mud between the piston and cylinder walls. For this reason the operation of coupling or uncoupling the two rods is laborious and time consuming.

In accordance with the present invention, it is now made possible to quickly join together pony and mud pump piston rods in such a way that the latter need not be rotated more than a very small amount during connection; and yet the invention retains the advantageous rod aligning and connecting features provided by a threaded coupling. This invention contemplates the use of an improved split bushing which is easily and quickly joined to end portions of the pony and piston rods. Shoulders are formed on the split bushing and on the two shafts to transmit reciprocating movement of the pony rod to the piston rod, and the split bushing halves are held in shaft interengaging position by a nut.

The invention also enables the improved split bushing to be used in combination with existing piston rods, since the bushing is threaded to engage the threaded ends of these rods.

The above and other features of the invention will be better understood from the following detailed description of the drawing, in which.

Figures 1, 2, 3:
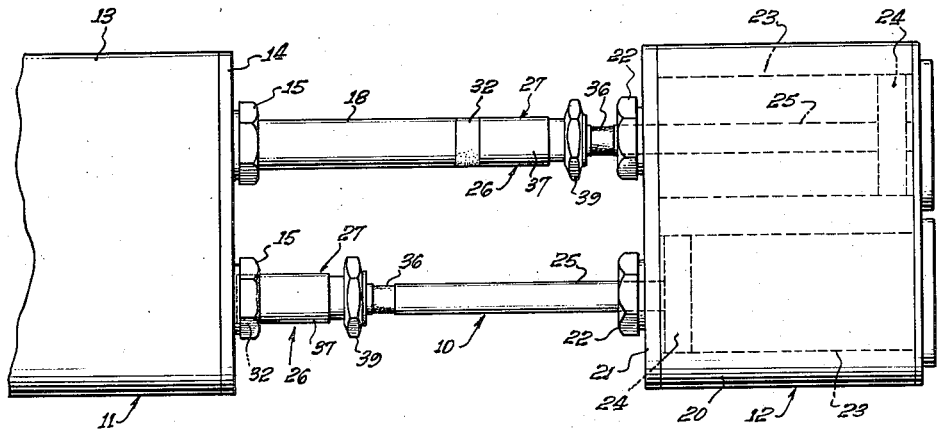
Fig. 1 is an elevation illustrating a prime mover driving a mud pump through appropriate shafting.
Fig. 2 is an enlarged sectional view illustrating in detail the connection means joining the pony shaft of the prime mover with the piston shaft of the mud pump.
Fig. 3 is a view taken on line 3—3 of Fig. 2.

Shaft means 10 connecting a prime mover 11 and a mud pump 12 is shown in Fig. 1 of the drawings. The prime mover includes a housing 13, end plate 14, and shaft bearings 15 joined to the end plate, and means driven by a crank, not shown, for reciprocating a pair of pony rods 18. The pony rods extend through the bearings 15 and toward the mud pump 12.

The mud pump 12 includes housing 20, end plate 21, and bearings 22 joined to the end plate, and encloses a pair of cylinders 23 containing pistons 24. Piston shafts 25 extend through the bearings 22 toward the pony shafts 18, and it will be understood that on reciprocation of the pistons 24, circulating fluid or mud is drawn into and forced out of cylinders 23 under extremely high pressure. The abrasive quality of the mud becoming entrained between the walls of the cylinders and pistons makes turning or axial motion of the pistons very difficult for any purpose of repair or replacement of parts.

Each piston rod 25 is joined to its corresponding pony rod 18 by the connection means 26. As shown in Fig. 2, the connection means includes a coupling device 27 for joining the extension 28 of each pony or intermediate rod to the end portion 29 of each portion rod. An annular sloped shoulder 30 is formed on a flange 31 formed on extension 28, the shoulder defining a section of a dove-tail connection. Also mounted on pony shaft 18 is a rubber ring 32 having tapered wall 33 in engagement with the tapered section 34 of the rod 18 to keep sand and other foreign matter out of contact with the internal portions of the connection means 26. The end portion 29 of piston rod 25 is externally threaded, and a knurled section 36 is formed upon rod 25 adjacent end portion 29. The knurled section 36 enables the rod to be gripped by the jaws of a wrench and rotated. It will be noted that piston rod end portion 29 is of standard design, and need not be altered for use in conjunction with the improved shaft connection means 26.

The coupling device 27 includes a pair of semicylindrical sections or split halves 37 which together form a split bushing. Each section 37 includes a sloped shoulder 38 formed at one end of a recess 39 contained in that section, the shoulder 38 defining the complementary section of the dovetail connection mentioned above. The inner surface of each bushing section 37 is threaded near the opposite end of the section to engage the threaded end 29 of the piston shaft. A hexagonal nut 39 is also mounted on the threaded end portion 29 of piston shaft 25. The nut has a counterbore recess 50 with a recessed and sloped end wall 40 which engages the sloped end face 41 of each of the sections 37, the counterbore 50 closely receiving and overlapping the end portions of the sections 37 to maintain them in engagement with the threaded portion 29 of the piston shaft, and to lock the assembly in position to prevent unscrewing and loosening thereof.

In order to couple the pony or intermediate rod 18 to the piston rod 25, the lock nut 39 is screwed on the threaded end 29 of rod 25 as far as it will go. Next, the threaded ends of the split halves or sections 27 are pried apart sufficiently to allow the piston rod 25 to be pushed between the halves, and the end 42 of the rod is jammed against the end 43 of the intermediate rod extension 28. The split halves are then brought together to clamp around the external threads on the end 29 of the piston rod, and if necessary the halves may be rotated slightly to match their threads with the piston rod threads. Following this, the lock nut 39 is screwed against the split halves and hand-tightened, making sure that the counterbore recess on the lock nut receives the split halves to prevent loosening of the assembly. Finally, the piston rod is firmly tightened against the extension 28 and the lock nut 39 tightened against the split halves 27.

To uncouple the pony and piston rods, the lock nut is loosened from the split halves, and the piston rod is backed off from the extension 28 about one turn. The split halves may then be pried apart to permit the piston rod to be pulled completely away from the pony rod.

We claim:

1. The combination, comprising prime mover having a pony rod and means through which the rod projects, said rod having a cylindrical surface sized for reciprocation through said means and a shoulder facing axially oppositely from the rod end, a mud pump piston rod having a threaded shank axially aligned with the pony rod and abutting said end thereof, a split bushing spanning said shoulder and shank and including another shoulder and threads respectively engaging said pony rod shoulder and the shank threads to releasably hold said rods in end abutting relation whereby axial movement of the pony rod may be transmitted to the piston rod, said split bushing being within a cylindrical axial projection of said pony rod surface so as to be receivable within said means during rod reciprocation, and a nut mounted on said shank and having a recess receiving the end of said bushing to prevent disengagement of said shoulders and threads, said nut being rotatable on the shank away from the bushing to free it for separation from the shank permitting release of the piston rod from connection to the pony rod.

2. The combination, comprising prime mover having a pony rod and means through which the rod projects, said rod having a cylindrical surface sized for reciprocation through said means and an undercut external shoulder facing axially oppositely from the rod end, a mud pump piston rod having an externally threaded shank axially aligned with the pony rod and abutting said end thereof, a split bushing spanning said shoulder and shank and including an undercut internal shoulder and internal threads respectively engaging said pony rod shoulder and the shank threads to releasably hold said rods in end abutting relation and said shoulders against separation whereby axial movement of the pony rod may be transmitted to the piston rod, said split bushing being within a cylindrical axial projection of said pony rod surface so as to be receivable within said means during rod reciprocation, and a nut mounted on said shank and having a recess receiving the end of said bushing to prevent disengagement of said threads, said nut being rotatable on the shank away from the bushing to free it for separation from the shank permitting release of the piston rod from connection to the pony rod.

3. The invention as defined in claim 2, in which said undercut internal and external shoulders are annular and complementary.

4. The combination, comprising prime mover having a pony rod and means through which the rod projects, said rod having a cylindrical surface sized for reciprocation through said means and a reduced diameter end portion carrying an undercut flange facing oppositely from the rod end, a mud pump piston rod having an externally threaded shank axially aligned with the pony rod and abutting the end thereof, a split bushing spanning said flange and shank and including an undercut collar and internal threads respectively engaging said flange and said shank threads to releasably hold the rods in end abutting relation and said flange and collar against separation whereby axial movement of the pony rod may be transmitted to the piston rod, said split bushing being within a cylindrical axial projection of said pony rod surface so as to be receivable within said means during rod reciprocation, and a nut mounted on said shank and having a recess receiving the end of said bushing to prevent disengagement of said threads, said nut being rotatable on the shank away from the bushing to free it for separation from the shank permitting release of the piston rod from connection to the pony rod.

5. The invention as defined in claim 4, in which said pony rod has an annular shoulder intersecting said cylindrical surface and spaced from the end of said bushing, and an elastomeric ring in said space seating against said shoulder and said bushing end.

References Cited in the file of this patent

UNITED STATES PATENTS

| | | |
|---|---|---|
| 50,190 | Watson | Sept. 26, 1865 |
| 120,686 | Weston | Nov. 7, 1871 |
| 459,910 | Hogan | Sept. 22, 1891 |
| 698,439 | Brooks | Apr. 29, 1902 |
| 1,263,222 | Francke | Apr. 16, 1918 |
| 1,409,067 | Russ | Mar. 7, 1922 |
| 2,384,953 | Miller | Sept. 18, 1945 |